US008351971B2

(12) United States Patent
Spjuth

(10) Patent No.: US 8,351,971 B2
(45) Date of Patent: Jan. 8, 2013

(54) GLOBAL POSITIONING SYSTEM (GPS)-BASED COMMUNICATION FILTER

(75) Inventor: Par Spjuth, Sodra Sandby (SE)

(73) Assignee: Sony Mobile Communications AB, Lund (SE)

( * ) Notice: Subject to any disclaimer, the term of this patent is extended or adjusted under 35 U.S.C. 154(b) by 302 days.

(21) Appl. No.: 12/540,901

(22) Filed: Aug. 13, 2009

(65) Prior Publication Data
US 2011/0009127 A1    Jan. 13, 2011

Related U.S. Application Data

(60) Provisional application No. 61/224,593, filed on Jul. 10, 2009.

(51) Int. Cl.
H04B 7/00    (2006.01)
H04M 3/42   (2006.01)
H04W 24/00  (2009.01)

(52) U.S. Cl. .................. 455/518; 455/456.1; 455/414.1

(58) Field of Classification Search .................. 455/518, 455/456.1, 414.1
See application file for complete search history.

(56) References Cited

U.S. PATENT DOCUMENTS

| 2002/0037707 | A1* | 3/2002 | Yoshioka et al. | 455/404 |
| 2002/0107008 | A1* | 8/2002 | Hendrey et al. | 455/416 |
| 2004/0198376 | A1* | 10/2004 | Chandhok et al. | 455/456.1 |
| 2005/0003844 | A1* | 1/2005 | Nishiga et al. | 455/517 |
| 2006/0089097 | A1* | 4/2006 | Wang et al. | 455/3.02 |
| 2008/0132252 | A1  | 6/2008 | Altman et al. | |

FOREIGN PATENT DOCUMENTS

EP    1 802 145 A1    6/2007

OTHER PUBLICATIONS

Notification of Transmittal of the International Search Report and the Written Opinion of the International Searching Authority, or the Declaration corresponding to PCT/IB2009/055998, mailed Aug. 9, 2010, 12 pages.
International Preliminary Report on Patentability dated Oct. 18, 2011 issued in corresponding PCT application No. PCT/IB2009/055998, 13 pages.
International Search Report and Written Opinion dated Jan. 10, 2012 issued in corresponding PCT application No. PCT/IB2009/055998, 7 pages.

* cited by examiner

*Primary Examiner* — Ariel Balaoing
(74) *Attorney, Agent, or Firm* — Snyder, Clark, Lesch & Chung, LLP

(57) ABSTRACT

A device includes a memory to store a plurality of instructions and a processor to execute instructions in the memory to determine a location of a mobile communication device, determine a direction of movement of the mobile communication device, identify other mobile communication devices within a particular distance of the mobile communication device, identify other mobile communication devices moving in a particular direction with respect to the mobile communication device, and store, in the memory, a list of the identified other mobile communication devices.

20 Claims, 10 Drawing Sheets

GLOBAL POSITIONING SYSTEM (GPS)-BASED COMMUNICATION FILTER

RELATED APPLICATION

This application claims priority under 35 U.S.C. §119 based on U.S. Provisional Application Ser. No. 61/224,593, filed Jul. 10, 2009, the disclosure of which is hereby incorporated herein by reference.

BACKGROUND

With the development of wireless devices, such as wireless, portable, handheld, and mobile communication devices, users may access and exchange information anywhere and anytime. A user's mobility may add certain complexities with respect to establishing communications, and a wireless device may utilize various techniques to communicate with other users or groups of users. For example, a user of a wireless device may communicate with other users by dialing a number or by selecting a contact in the user's contact list. However, in certain situations, a first user may want to communicate with a second user, even though the first user does not have the second user's contact information. For example, a user in a vehicle may want to communicate with another user in another vehicle. Given the large number of situations a user may encounter, in which communication with another user is desired, the limited ability to interact with other users of mobile communication devices can be increasingly troublesome.

SUMMARY

According to one aspect, a device may include a memory to store a plurality of instructions; and a processor to execute instructions in the memory to determine a location of a mobile communication device, determine a direction of movement of the mobile communication device, identify other mobile communication devices within a particular distance of the mobile communication device, identify other mobile communication devices moving in a particular direction with respect to the mobile communication device, and store, in the memory, a list of the identified other mobile communication devices.

Additionally, the device may be included within the mobile communication device.

Additionally, the device may further include a Global Positioning System (GPS) receiver, and where the processor may be further to determine the location of the mobile communication device using information obtained from the GPS receiver.

Additionally, the processor may be further to determine the direction of movement of the mobile communication device using information obtained from the GPS receiver.

Additionally, the device may include a server device remote from the mobile communication device, and where the server device communicates with the mobile communication device through a communications network.

Additionally, the processor may be further to determine location of the mobile communication device using at least one of information received by a GPS receiver, information received from a sensor located within the mobile communication device, information received from a base station associated with the mobile communication device, information inputted by a user of the mobile communication device, information received from sensors associated with the location of mobile communication device, or previously stored location information.

Additionally, the device may include a user interface for sending and receiving messages to the other mobile communication devices included in the list.

Additionally, the list may function as a push to talk over cellular group.

According to another aspect, a method, performed by a device that includes a processor and a memory, may include determining, by the processor, a location of a mobile communication device, determining, by the processor, a direction of movement of the mobile communication device, identifying, by the processor, other mobile communication devices connected to a communications network associated with the mobile communication device, filtering, by the processor, the identified other mobile communication devices based on a distance from the location of the mobile communication device, filtering, by the processor, the identified other mobile communication devices based on direction of movement in relation to the direction of movement of the mobile communication device, and storing, in the memory, a list of mobile communication devices filtered based on the distance and filtered based on the direction of movement.

Additionally, the method may include receiving a message from the mobile communication device, and sending the message to all mobile communication devices on the list.

Additionally, the method may include receiving identification information identifying a vehicle associated with the mobile communication device, and including the identification information with the message when sending the message to the mobile communication devices on the list.

Additionally, the method may include receiving a message from one of the mobile communication devices on the list, and sending the message to the mobile communication device.

Additionally, the method may include receiving identification information identifying a vehicle associated with the message, and providing the identification information, via the message, to the mobile communication device.

Additionally, the location of the mobile communication device may be determined based on information obtained from a Global Positioning System (GPS) receiver associated with the mobile communication device.

Additionally, the direction of movement of the mobile communication device may include a direction vector, and where the filtering based on direction is based on a difference in an angle between the direction vector of the mobile communication device and direction vectors of the other mobile communication devices.

Additionally, the filtering based on direction may include selecting all other mobile communication devices that are moving in substantially a same direction as the mobile communication device.

Additionally, the filtering based on direction may include selecting all other mobile communication devices that are moving in substantially an opposite direction from the mobile communication device.

Additionally, the filtering based on a distance may include filtering based on at least one of information received by a GPS receiver, information received from a sensor located within the mobile communication device, information received from a base station associated with the mobile communication device, information inputted by a user of the mobile communication device, information received from sensors associated with the location of mobile communication device, or previously stored location information.

Additionally, the filtering based on a direction of movement may include filtering based on at least one of location information received at two different points in time, information received from a sensor located within the mobile communication device, information inputted by a user of the mobile communication device, information received from a sensor associated with a location of the mobile communication device, or previously stored direction of movement information.

In yet another aspect, a system may include means for determining a location of a mobile communication device based on information obtained by a Global Positioning System (GPS) receiver associated with the mobile communication device, means for determining a direction of movement of the mobile communication device, means for identifying other mobile communication devices that are within a particular distance of the mobile communication device, means for selecting ones of the identified other mobile communication devices that are moving in substantially the same direction as the mobile communication device, means for receiving a message from the mobile communication device, and means for providing the message to the selected ones of the other mobile communication devices.

BRIEF DESCRIPTION OF THE DRAWINGS

The accompanying drawings, which are incorporated in and constitute a part of this specification, illustrate one or more systems and/or methods described herein and, together with the description, explain these systems and/or methods. In the drawings.

DETAILED DESCRIPTION

The following detailed description refers to the accompanying drawings. The same reference numbers in different drawings identify the same or similar elements. Also, the following detailed description does not limit the invention.

When riding a motorized vehicle, such as a car or a boat, it may be very difficult to communicate with other nearby drivers in a useful way. In a car on a highway, or in a boat, it may be common for drivers to have useful information that may need to be communicated, as a message, to other drivers. Examples of such messages may include: "car driving in the wrong way in our lane"; or "please drive past me if you want to drive faster, my car can't go faster because it is broken and I am on my way to a repair shop"; or, in the context of boats, "watch out for that underwater rock, you're steering right towards it." Existing communication methods may not be able to convey such messages from one driver to another driver.

Systems and/or methods described herein may relate to a communication filter. A communications network, such as a mobile communications network, may enable communications between many users of mobile communication devices. A communications network may include thousands or even millions of users. A user may want to send a message to a particular group of users, or receive messages from a particular group of users. A communication filter may select which user or group of users receives a message, or may select from which user or group of users to receive messages. The communication filter may be based on information obtained from a Global Positioning System (GPS), an existing global navigation satellite system, etc. The communication filter may select, with respect to a user, mobile communication devices (also referred to herein as "units") of other users that are within a particular distance of the user and are also moving in a particular direction of the user. Thus, the communication filter may select units in the network based on distance and direction.

Figure 1A:
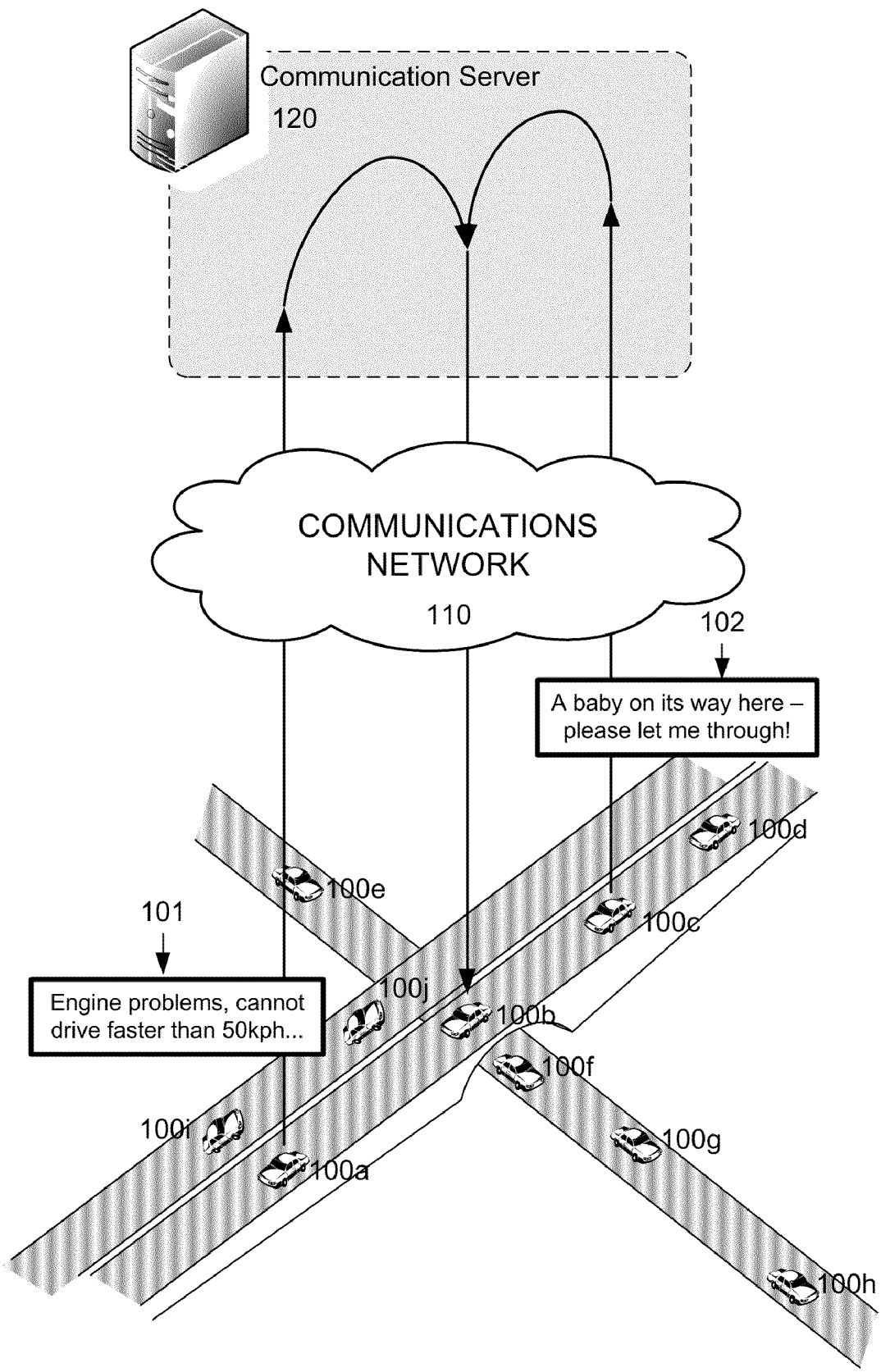
FIG. 1A is a diagram illustrating an overview of an exemplary implementation described herein.

FIG. 1A is a diagram illustrating an overview of an exemplary implementation described herein. A communications network 110 may include mobile communication devices in vehicles 100a-100j, and a communication server 120. Vehicles 100a-100j may be traveling on roads and may be able to communicate via communications network 110 and the mobile communication devices located within the vehicles. Communications between users of communications network 110 may be facilitated by server 120. Some drivers may need to send a message to other drivers on the road. For example, a driver of vehicle 110a may need to send a message 101, informing other drivers of engine trouble and slow speed, so that other drivers may avoid vehicle 110a. As another example, a driver of vehicle 100c may need to send a message 102, informing other drivers that a woman in the vehicle is about to deliver to baby, so that other drivers may let vehicle 100c pass. However, messages 101 and 102 may not be relevant to drivers of vehicles 100e-100j, as these vehicles may be either on a different road or traveling in an opposite direction. Messages 101 and 102 may also not be relevant to a driver of vehicle 100d, as this vehicle may be located too far away. A communication filter according to the implementations described herein may select which vehicles are within relevant range of the vehicle sending the message, and which vehicles are traveling in substantially the same direction as the vehicle sending the message, and may send the message to the selected vehicles. For example, the communication filer may determine that vehicle 100b is within the relevant distance and traveling in substantially the same direction as vehicles 100a and 100c, and may send messages 101 and 102 to vehicle 100b.

Figure 1B:
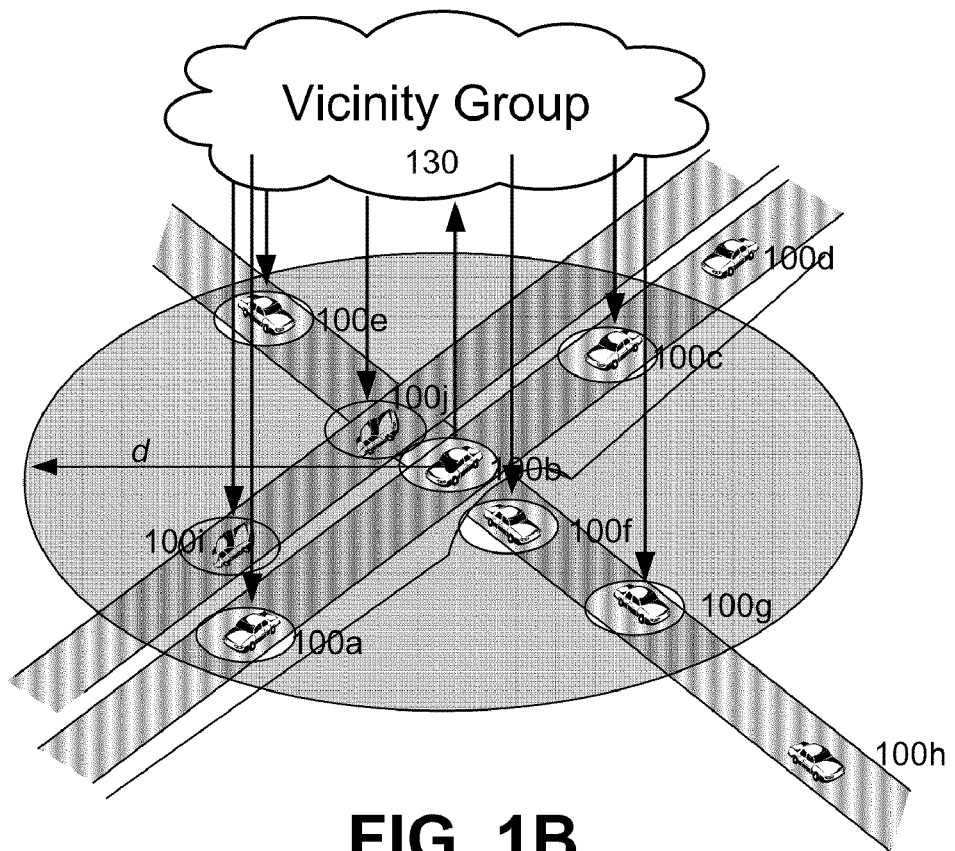
FIG. 1B is a diagram illustrating a first aspect of the overview of FIG. 1A.

FIG. 1B is a diagram illustrating a first aspect of the overview of FIG. 1A. A vicinity group 130 with respect to vehicle 100b may be determined. All vehicles located with a specified distance of vehicle 100b may be identified as belonging to vicinity group 130 of vehicle 100b. In FIG. 1B, a specified distance may include diameter d, and vehicles 100a, 100c, 100e, and 100g may be located within diameter d of vehicle 100b. Therefore, vehicles 100a, 100c, 100e, 100g, 100i, and 100j may be designated as belonging to vicinity group 130 of vehicle 100b.

Figure 1C:
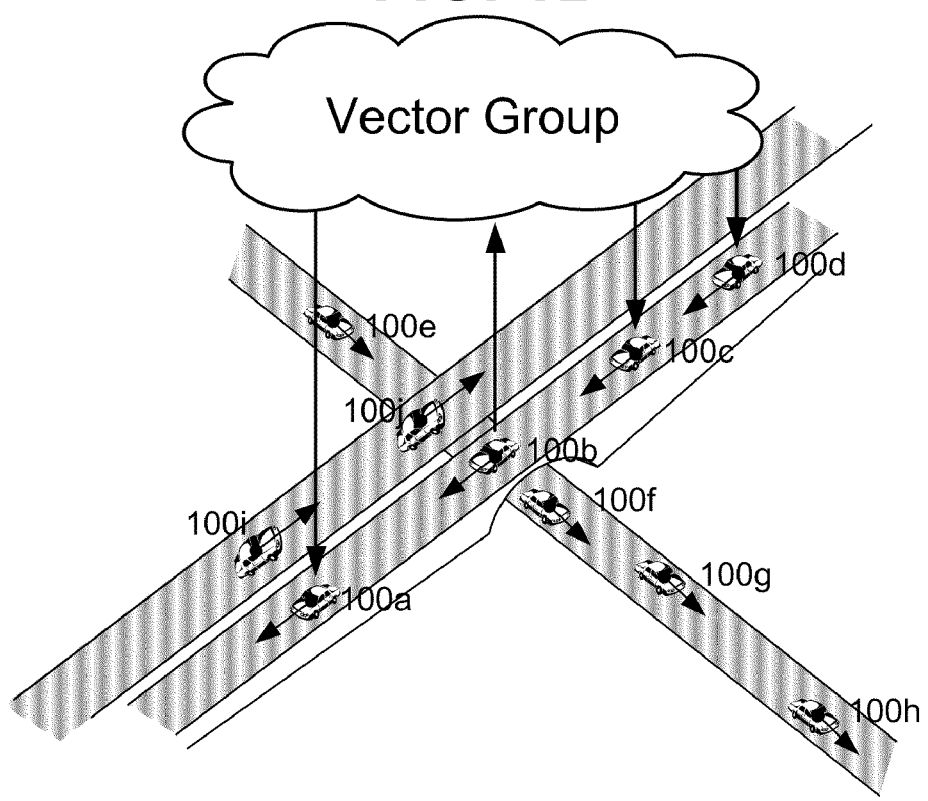
FIG. 1C is a diagram illustrating a second aspect of the overview of FIG. 1A.

FIG. 1C is a diagram illustrating a second aspect of the overview of FIG. 1A. A vector group 140 with respect to vehicle 100b may be determined. All vehicles traveling in substantially a same direction as vehicle 100b may be identified as belonging to vector group 140 of vehicle 100b. A direction of movement may be specified by a movement vector, and vehicles that have a movement vector that is within a particular range of angles of the movement vector of vehicle 100b may be identified as belonging to vector group 140 of vehicle 100b. In the implementation depicted in FIG. 1C, vehicles 100a, 100c, and 100d may be traveling in a same direction as vehicle 100b, and may be designated as belonging to vector group 140 of vehicle 100b. Vehicles 100i and 100j may be traveling in the opposite direction as vehicle 100b, and therefore may be excluded from vector group 140. In another implementation, the driver of vehicle 100b may want to communicate with drivers of vehicles going in the opposite direction, and vehicles 100i and 100j may be included in a vector group, while vehicles 100a, 100c, and 100d may be excluded from the vector group.

An intersection of vicinity group 130 and vector group 140 may be determined and messages from users in vehicles that belong to both vicinity group 130 and vector group 140 may be provided to vehicle 100b. Furthermore, any messages from vehicle 100b may be provided to all the vehicles belonging to the intersection of vicinity group 130 and vector group 140. Returning to FIG. 1A, the intersection of vicinity group 130, which includes vehicles 100a, 100c, 100e, 100f, 100g, 100i, and 100j, and of vector group 140, which includes vehicles 100a, 100c, and 100d, may include vehicles 100a and 100c. Thus, a communication filter according to the implementations described herein may simulate a short range radio communications network between vehicles 100a, 100b, and 100c. The simulated short range radio communications network may be implemented using a push-to-talk (PTT) over cellular (PoC) method. A PoC group may be a group of users that may communicate with each other in a manner similar to walkie-talkie radios. In other words, a PoC group may be implemented as a form of half-duplex communication, in which only one user may talk at a time. However, the communication filter may include any form of messages that may be implemented in communications network 110, such as voice messages, video messages, text messages, email messages, or instant messages.

While FIGS. 1A-1C illustrate vehicles on a road, a communication filter according to the implementations described herein may be used in any situation involving multiple moving units (which include mobile communication devices). For example, the communication filter may be used in the context of watercraft, such as boats, moving on a body of water, or in the context of bicyclists and/or pedestrians moving on a trail, on a street, or even inside a building.

Figure 2:
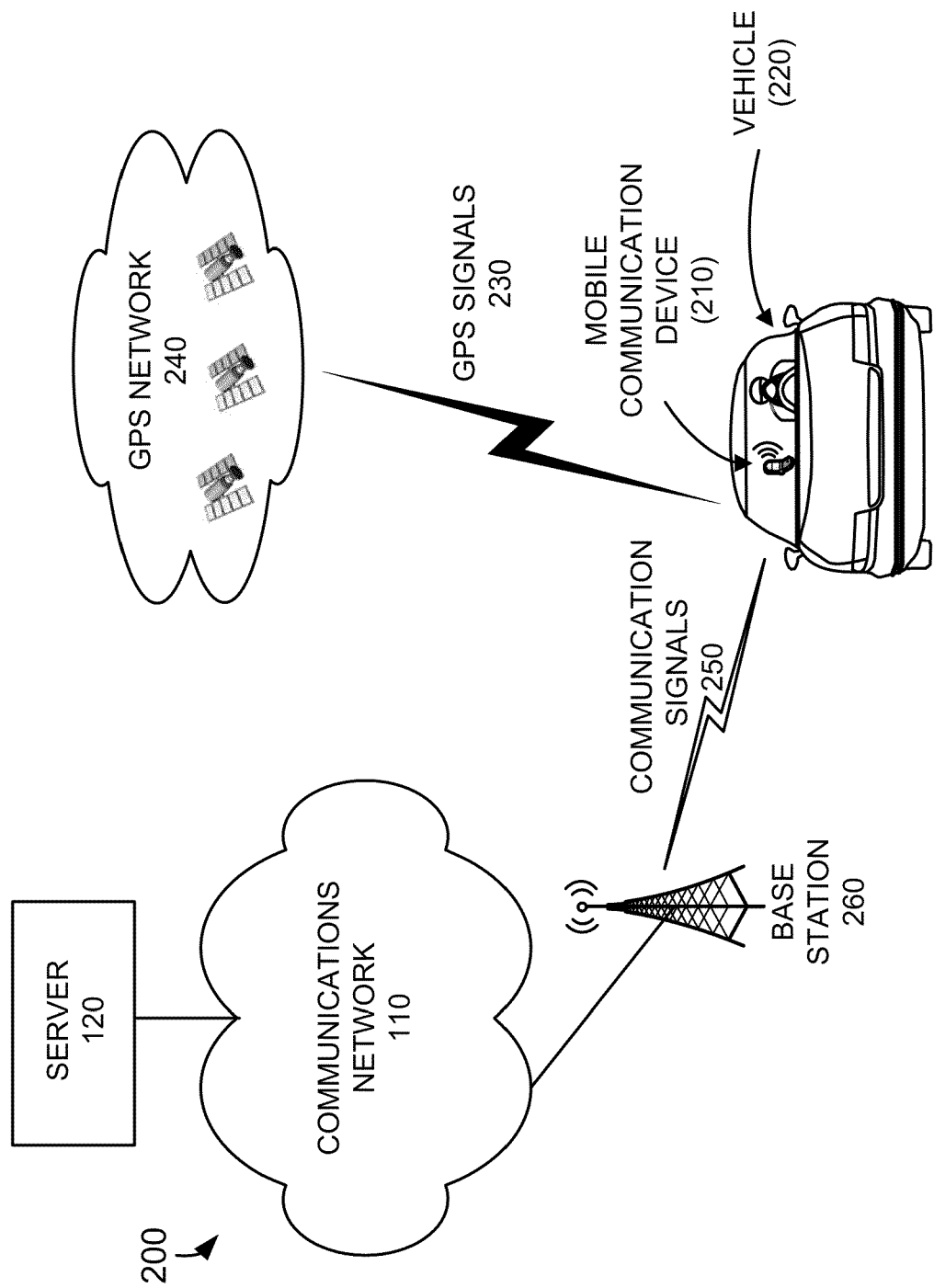
FIG. 2 is a diagram of an exemplary environment in which systems and/or methods described herein may be implemented.

FIG. 2 is a diagram of an exemplary environment 200 in which systems and/or methods described herein may be implemented. As shown, environment 200 may include a mobile communication device 210, a vehicle 220, GPS signals 230, a GPS network 240, communication signals 250, a base station 260, communications network 110, and server 120. A user driving vehicle 220 may have mobile communication device 210 in the user's possession. Mobile communication device 210 may be a handheld device, such as a mobile phone, or a device mounted in the vehicle.

Mobile communication device 210 may include a GPS receiver and may receive GPS signals 230 from GPS network 240. GPS network 240 may include global navigation positioning satellites. The GPS receiver in mobile communication device 210 may determine the location of mobile communication device 210 based on the received GPS signals 230. GPS signals 230 may also be received by a GPS receiver located in vehicle 220 outside mobile communication device 210 and provided to mobile communication device 210 through a short range wireless connection (e.g. a Bluetooth connection) or through a cable connection (e.g., a Universal Serial Bus (USB) connection).

Mobile communication device 210 may communicate with base station 260 through communication signals 250. Base station 260 may include a cellular tower that sends and receives radio signals in a mobile communications network. Base station 260 may communication with communications network 110. Communications network 110 may include a mobile communications network. Communications network 110 may also include the Internet or may be connected to the Internet. Server 120 may be connected to communications network 110 and may communicate with mobile communication device 210 via communications network 110. Server 120 may receive information from mobile communication device 210 and may provide information to mobile communication device 210. For example, server 120 may receive location and direction information from mobile communication device 210, determine a vicinity and vector group of mobile communication device 210, and create a subgroup for mobile communication device 210. Server 120 may receive messages from mobile communication device 210 and send the messages to other mobile communication devices in the subgroup. Server 120 may also receive messages from the other mobile communication devices in the subgroup and send the messages to mobile communication device 210.

Exemplary Devices

Figure 3:
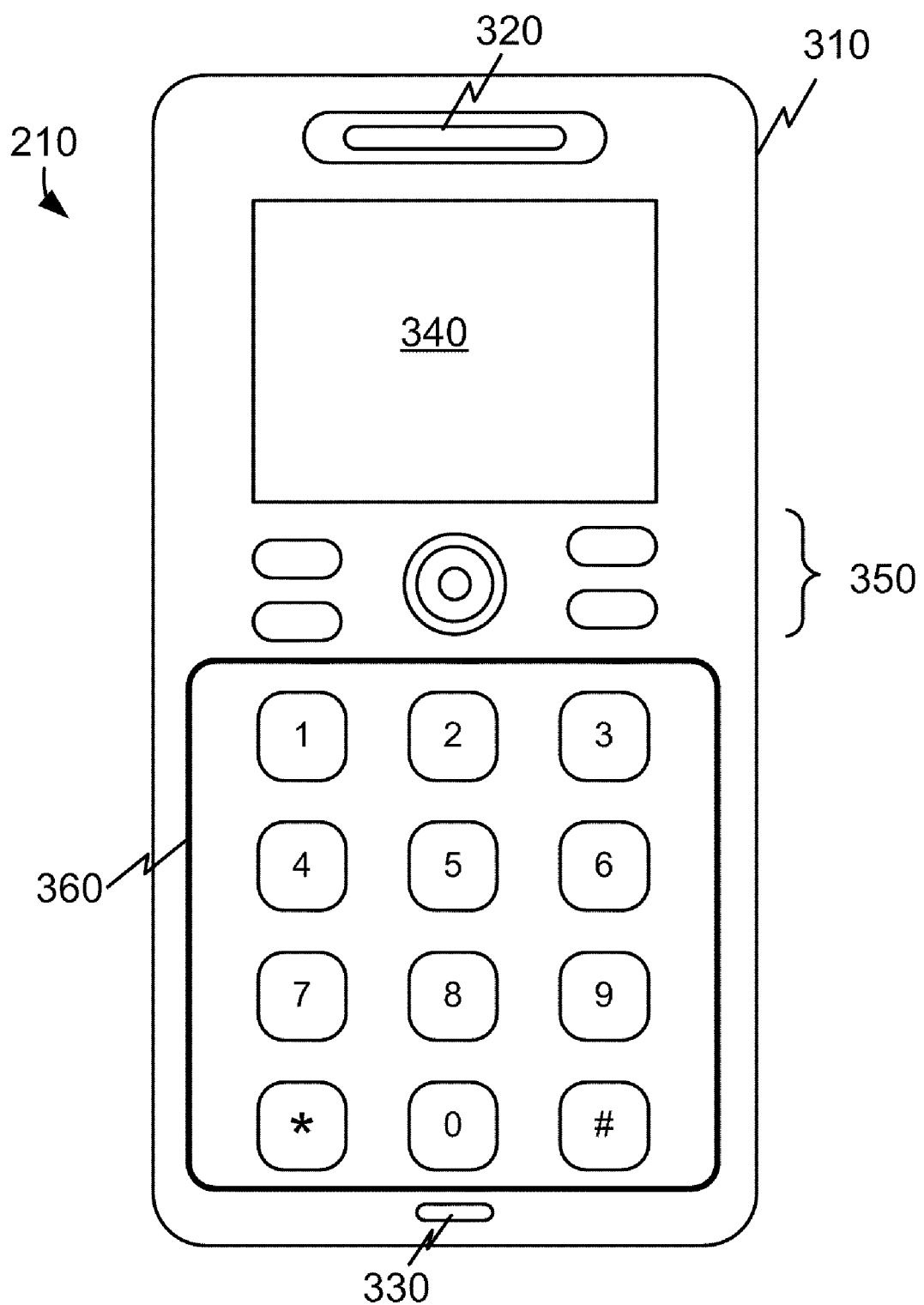
FIG. 3 is a diagram of an exemplary mobile communication device in which systems and/or methods described herein may be implemented.

FIG. 3 is a diagram of an exemplary mobile communication device 210 in which systems and/or methods described herein may be implemented. Mobile communication device 210 may include a cellular radiotelephone with or without a multi-line display; a personal communications system (PCS) terminal that may combine a cellular radiotelephone with data processing, facsimile and data communications capabilities; a personal digital assistant (PDA) that may include a radiotelephone, pager, Internet/Intranet access, Web browser, organizer, calendar and/or a GPS receiver; a laptop and/or palmtop receiver; a communication device mounted on the dashboard of a vehicle; or other appliances that include a radiotelephone transceiver. Mobile communication device 210 may also include media playing capability. As described above, systems and/or methods described herein may also be implemented in other devices that require user input, with or without communication functionality.

Referring to FIG. 3, mobile communication device 210 may include a housing 310, a speaker 320, a microphone 330, a display 340, control buttons or keys 350, and a keypad 360.

Housing 310 may protect the components of mobile communication device 210 from outside elements. Housing 310 may include a structure configured to hold devices and components used in mobile communication device 210, and may be formed from a variety of materials. For example, housing 310 may be formed from plastic, metal, or a composite, and may be configured to support speaker 320, microphone 330, display 340, control buttons 350, and/or keypad 360.

Speaker 320 may provide audible information to a user of mobile communication device 210. Speaker 320 may be located in an upper portion of mobile communication device 210, and may function as an ear piece when a user is engaged in a communication session using mobile communication device 210. Speaker 320 may also function as an output device for music and/or audio information associated with games, voicemails, and/or video images played on mobile communication device 210.

Microphone 330 may receive audible information from the user. Microphone 330 may include a device that converts speech or other acoustic signals into electrical signals for use by mobile communication device 210. Microphone 330 may be located proximate to a lower side of mobile communication device 210.

Display 340 may provide visual information to the user. Display 340 may be a color display, such as a red, green, blue (RGB) display, a monochrome display or another type of display. In one implementation, display 340 may include a touch sensor display or a touch screen that may be configured to receive a user input when the user touches display 340. For example, the user may provide an input to display 340 directly, such as via the user's finger, or via other input objects, such as a stylus. User inputs received via display 340 may be processed by components and/or devices operating in mobile communication device 210. The touch screen display may permit the user to interact with mobile communication device 210 in order to cause mobile communication device 210 to perform one or more operations. In one exemplary implementation, display 340 may include a liquid crystal display (LCD) display. Display 340 may include a driver chip (not shown) to drive the operation of display 340.

Control buttons 350 may permit the user to interact with mobile communication device 210 to cause mobile communication device 210 to perform one or more operations, such as place a telephone call, play various media, etc. For example, control buttons 350 may include a dial button, a hang up button, a play button, etc.

Keypad 360 may include a telephone keypad used to input information into mobile communication device 210.

In an exemplary implementation, control buttons 350 and/or keypad 360 may be part of display 340. Display 340, control buttons 350, and keypad 360 may be part of an optical touch screen display. In addition, in some implementations, different control buttons and keypad elements may be provided based on the particular mode in which mobile communication device 210 is operating. For example, when operating in a cell phone mode, a telephone keypad and control buttons associated with dialing, hanging up, etc., may be displayed by display 340. In other implementations, control buttons 350 and/or keypad 360 may not be part of display 340 (i.e., may not be part of an optical touch screen display).

Figure 4:
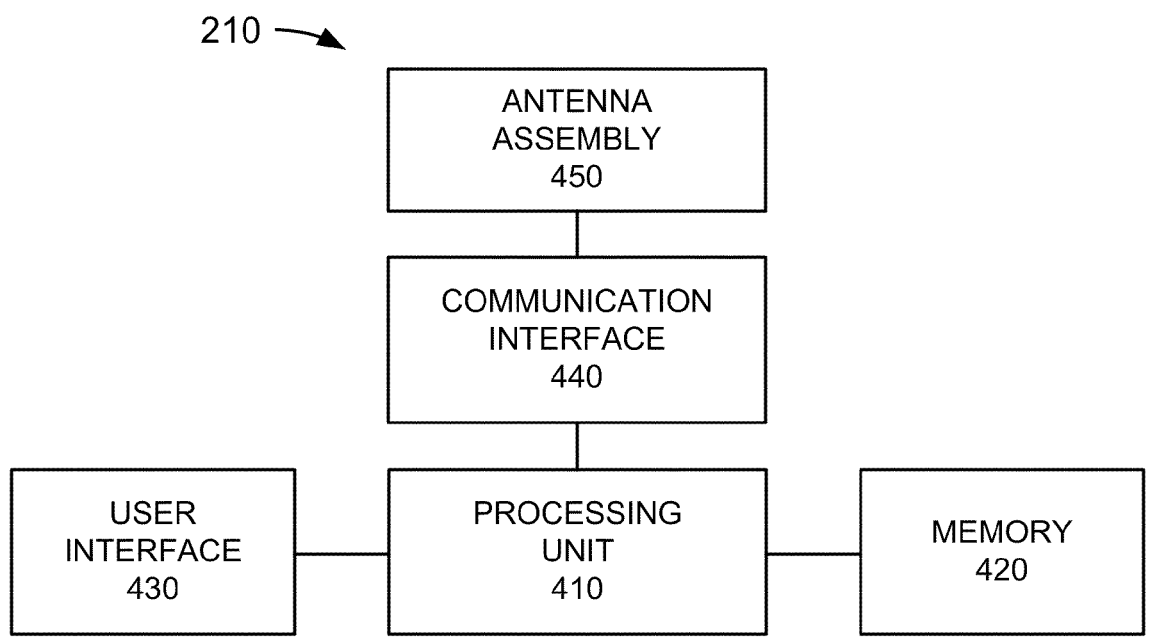
FIG. 4 is a diagram illustrating exemplary components of the mobile communication device of FIG. 3.

FIG. 4 illustrates a diagram of exemplary components of device 210. As shown in FIG. 4, mobile communication device 210 may include a processing unit 410, a memory 420, a user interface 430, a communication interface 440, and an antenna assembly 450.

Processing unit 410 may include one or more processors, microprocessors, application specific integrated circuits (ASICs), field programmable gate arrays (FPGAs), or the like. Processing unit 410 may control operation of mobile communication device 210 and its components.

Memory 420 may include a random access memory (RAM), a read only memory (ROM), and/or another type of memory to store data and instructions that may be used by processing unit 410.

User interface 430 may include mechanisms for inputting information to mobile communication device 210 and/or for outputting information from mobile communication device 210. Examples of input and output mechanisms might include a speaker (e.g., speaker 320) to receive electrical signals and output audio signals; a camera lens to receive image and/or video signals and output electrical signals; a microphone (e.g., microphone 330) to receive audio signals and output electrical signals; buttons (e.g., a joystick, control buttons 350, or keys of keypad 360) to permit data and control commands to be input into mobile communication device 210; a display (e.g., display 340) to output visual information; and/or a vibrator to cause mobile communication device 210 to vibrate. Another input mechanism that may be included in mobile communication device 210 may be an electronic compass. An electronic compass may include one or more magnetic sensors the sense the Earth's magnetic field. An electronic compass may provide information about the location and/or orientation of mobile communication device 210.

Communication interface 440 may include any transceiver-like mechanism that enables mobile communication device 210 to communicate with other devices and/or systems. For example, communication interface 440 may include a modem or an Ethernet interface to a local area network (LAN). Communication interface 440 may also include mechanisms for communicating via a network, such as a wireless network. For example, communication interface 440 may include, for example, a transmitter that may convert baseband signals from processing unit 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and/or reception of the RF signals.

In one implementation, communication interface 440 may further include a GPS receiver that receives information from GPS satellites. In another implementation, communication interface 440 may receive information from GPS satellites indirectly, via another device. For example, communication interface 440 may receive GPS information from server 120 via a network, or from another GPS receiver located in the vicinity, such as a portable GPS receiver located on a dashboard of a vehicle. Communication interface 440 may receive GPS information from another device wirelessly or through a cable connection.

Alternately or additionally, communication interface 440 may receive location, orientation, and/or direction of movement information through other means. For example, communication interface 440 may receive location information from base station communications with mobile communication device 210 through Global System for Mobile communications (GSM) localization. GSM localization may use multilateration to compute the location of mobile communication device 210. Multilateration may also be known as hyperbolic positioning, and may use time difference of arrival (TDOA) of a signal at three different locations to compute the location of the emitting source of the signal. As another example, communication interface 440 may receive location, orientation, and/or direction of movement information form sensors located along a road.

Antenna assembly 450 may include one or more antennas to transmit and/or receive RF signals over the air. Antenna assembly 450 may, for example, receive RF signals from communication interface 440 and transmit them over the air and receive RF signals over the air and provide them to communication interface 440. In one implementation, for example, communication interface 440 may communicate with a network (e.g., a local area network (LAN), a wide area network (WAN), a telephone network, such as the Public Switched Telephone Network (PSTN), an intranet, the Internet, or a combination of networks).

Mobile communication device 210 may provide a platform for a user to make and receive telephone calls, send and receive electronic mail or text messages, play various media, such as music files, video files, multi-media files, or games, and execute various other applications. As described herein, mobile communication device 210 may perform these or other operations in response to processing unit 410 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into memory 420 from another computer-readable medium or from another device via communication interface 440. The software instructions contained in memory 420 may cause processing unit 410 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of mobile communication device 210, in other implementations, mobile communication device 210 may contain fewer, different, additional, or differently arranged components than depicted in FIG. 4. In still other implementations, one or more components of mobile communication device 210 may perform one or more other tasks described as being performed by one or more other components of mobile communication device 210.

Figure 5:
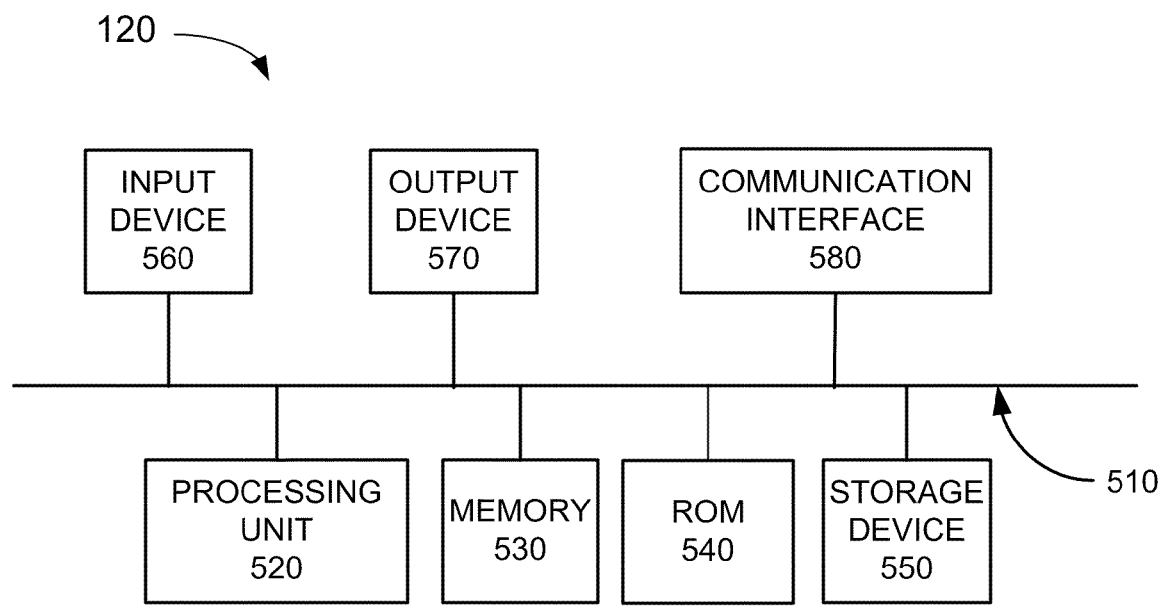
FIG. 5 is a diagram illustrating exemplary components of a server depicted in of FIG. 2.

FIG. 5 is a diagram illustrating exemplary components of server 120 of FIG. 2. As illustrated, server 120 may include a bus 510, a processing unit 520, a main memory 530, a ROM 540, a storage device 550, an input device 560, an output device 570, and/or a communication interface 580. Bus 510 may include a path that permits communication among the components of server 120.

Processing unit 520 may include one or more processors, microprocessors, or other types of processors that may interpret and execute instructions. Main memory 530 may include a RAM or another type of dynamic storage device that may store information and instructions for execution by processing unit 520. ROM 540 may include a ROM device or another type of static storage device that may store static information and/or instructions for use by processing unit 520. Storage device 550 may include a magnetic and/or optical recording medium and its corresponding drive.

In one implementation, storage device may include a location and direction database (not shown). The location and direction database may store location and direction information associated with each unit connected to communications network 110. Location information may be received by the location and direction database from each unit. For example, a unit may provide the unit's location based on information obtained from a GPS receiver within the unit. Alternately or additionally, location information for units may be determined by server 120, or another component of communications network 110. For example, location information of units may be based on base stations communicating with the units. Direction information may be received by the location and direction database from each unit. For example, a unit may calculate the direction of the unit based on two location measurements made at two different points in time, or a unit may directly sense the unit's direction with using a direction sensor (e.g. electronic compass). Alternately or additionally, location information for units may be calculated by server 120, or another component of communications network 110, based on two location measurements at two different points in time. Location and direction information for units in the location database may be updated based on a particular time interval, or based on particular events. For example, each time a particular unit initiates communication with a new base station, the location of the particular unit may be updated based on the location of the new base station. In another implementation, a location and direction database may be provided by another component of server 120 or by a component of communications network 110 that is remote from server 120.

Input device 560 may include a mechanism that permits an operator to input information to server 120, such as a keyboard, a mouse, a pen, a microphone, voice recognition and/or biometric mechanisms, a touch screen, etc. Output device 570 may include a mechanism that outputs information to the operator, including a display, a printer, a speaker, etc. Communication interface 580 may include any transceiver-like mechanism that enables server 120 to communicate with other devices and/or systems. For example, communication interface 580 may include mechanisms for communicating with another device or system via a network, such as communications network 110 and/or a short-range network.

As described herein, server 120 may perform certain operations in response to processing unit 520 executing software instructions contained in a computer-readable medium, such as main memory 530. The software instructions may be read into main memory 530 from another computer-readable medium, such as storage device 550, or from another device via communication interface 580. The software instructions contained in main memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of server 120, in other implementations, server 120 may contain fewer, different, differently arranged, or additional components than depicted in FIG. 5. In still other implementations, one or more components of server 120 may perform one or more other tasks described as being performed by one or more other components of server 120.

Figure 6:
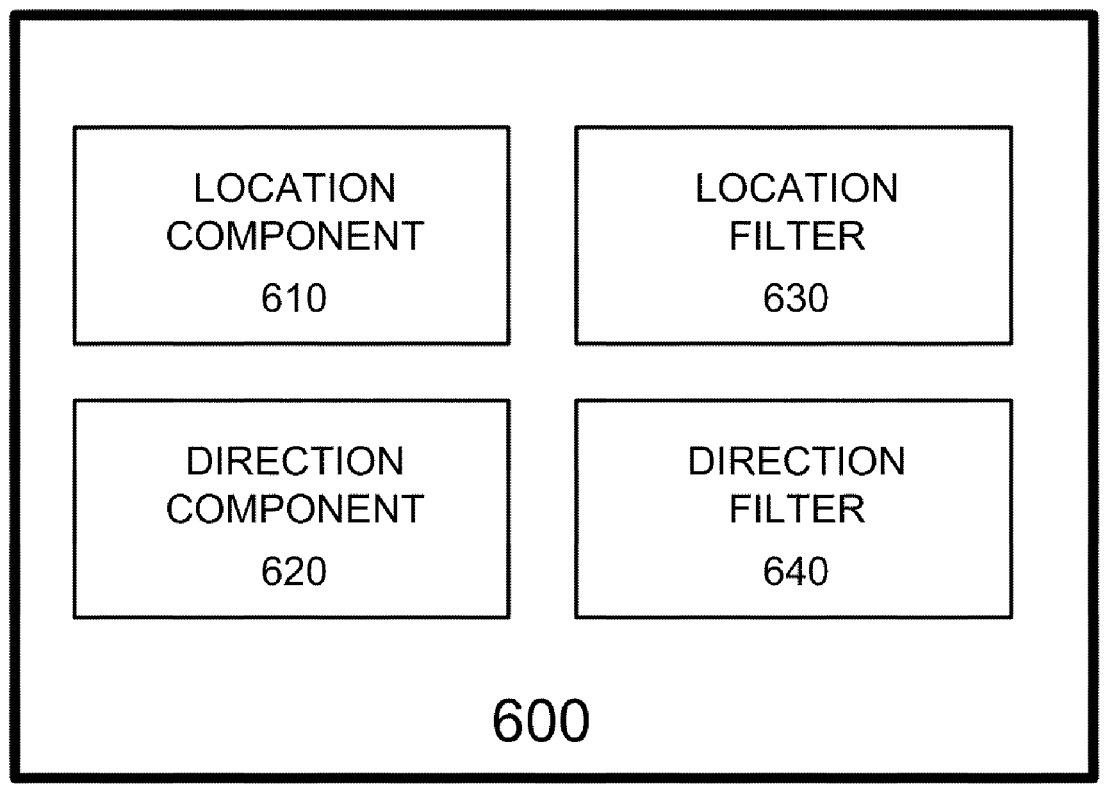
FIG. 6 is a diagram illustrating exemplary components of a communication filter according to the implementations described herein.

FIG. 6 illustrates exemplary components of a communication filter 600 according to the implementations described herein. In one implementation, communication filter 600 may be located within mobile communication device 210. For example, communication filter 600 may be implemented using processing unit 410 and memory 420, or may be implemented as a single unit, such as a single integrated circuit, within mobile communication device 210. In another implementation, communication filter 600 may be located within server 120. For example, communication filter 600 may be implemented using processing unit 520 and memory 530, or may be implemented as a single unit, such as a single integrated circuit, within server 120. In yet another implementation, communication filter 600 may be partially implemented within mobile communication device 210 and partially within server 120. Thus, any component of communication filter 600 may be implemented within mobile communication device 210, and any component of communication filter 600 may be implemented within server 120, in any combination.

In one implementation, the functions of communication filter 600 may be performed by one or more components of mobile communication device 210 (e.g., depicted in FIG. 4) and/or by one or more components of server 120 (e.g., depicted in FIG. 5). As shown in FIG. 6, communication filter 600 may include a location component 610, a direction component 620, a location filter 630, and a direction filter 640.

Location component 610 may determine a location of mobile communication device 210. Location component 610 may receive location information from server 120, from user interface 430, from memory 420 (or memory 530 or storage 540), from communication interface 440, or from any combination thereof. For example, location component 610 may receive location information from a GPS receiver implemented within communication interface 440, from user interface 430 based on user input or based on information received from sensors located within mobile communication device 210, from server 120 based on location information obtained by server 120, or from memory 420 based on location information that was previously stored in memory 420. The received location information may be in any form, such as longitude and latitude coordinates, or coordinates based on a hierarchical grid (e.g. a triangular hierarchical mesh grid).

Direction component 620 may determine a direction of movement of mobile communication device 210. In one implementation, direction component 620 may calculate the direction of movement based on location information received from location component 610. A direction of movement may be calculated from at least two location data points taken at two different times. For example, a first location ($x_1$, $y_1$) at time $t_1$, and a second location ($x_2$, $y_2$) at time $t_2$ can be used to compute a movement vector $v=(x_2-x_1)i+(y_2-y_1)j$. A speed of movement may be computed from this information as well. In another implementation, direction component 620 may receive direction information directly from server 120, user interface 430, memory 420, communication interface 440, or any combination thereof. For example, direction component 620 may receive direction information from user interface 430 based on user input or based on information received from sensors located within mobile communication device 210, from server 120 based on direction information obtained by server 120, or from memory 420 (or memory 530 or storage 540) based on direction information that was previously stored in memory 420. The direction information may be in any form, such as a direction vector or a compass direction. The direction vector may specify both the location and the direction of movement. The direction information may also be combined with the location information into a form relevant to vehicles. For example, the location and direction information may indicate a location on a particular road and a direction along the road, such as "Route 1, mile marker 15, heading south."

Location filter 630 may filter units of communications network 110 based on locations of the units. Units of communications network 110 may include mobile communication devices that are connected to communications network 110. Location filter 630 may identify all units connected to communications network 110. Location filter 630 may further receive location information associated with the units connected to communications network 110, as well the location information of mobile communication device 210. For example, location filter 630 may receive the location of mobile communication device 210 from location component 610. The locations of other units connected to communications network 110 may be retrieved from a storage location, such as a location and direction database associated with server 120. Location filter 630 may compare the location of mobile communication device 210 with the location of each other unit connected to communications network 110 and may select units that are within a particular distance of mobile communication device 210. In one implementation, the particular distance may be determined based on a radius from mobile communication device 210, and all units within the particular radius may be selected by location filter 630. In another implementation, the particular distance may be based on a hierarchical grid. For example, the location of mobile communication device 210 may include a cell in the hierarchical grid, and location filter 630 may identify all units connected to communications network 110 associated with the cell, with adjacent cells in the hierarchical grid, or with cells that are within a particular distance of the cell.

Direction filter 640 may filter units (i.e., other mobile communication devices) connected to communications network 110 based on direction of movement of the units. In one implementation, direction filter 640 may receive a set of units filtered based on location from location filter 630, and may filter the received set based on direction. In another implementation, direction filter 640 may identify all units connected to communications network 110, may filter all the units connected to communications network 110 based on direction, and may determine an intersection between the set of units filtered based on direction and the set of units filtered based on location, received from location filter 630. The direction of movement of other units connected to communications network 110 may be retrieved from a storage location, such as a location and direction database associated with server 120. Direction filter 640 may compare the direction of mobile communication device 210 with the direction of each other unit connected to communications network 110 and may select units that have substantially the same direction of movement as mobile communication device 210. The comparison between a direction of movement of mobile communication device 210 and another unit may be based on the difference in vector angles. Thus, if the difference between the vector angle of mobile communication device 210 and the vector angle of another unit is less than a particular threshold, than mobile communication device 210 and the other unit may be determined to have the same direction of movement.

Exemplary Processes

Figure 7:
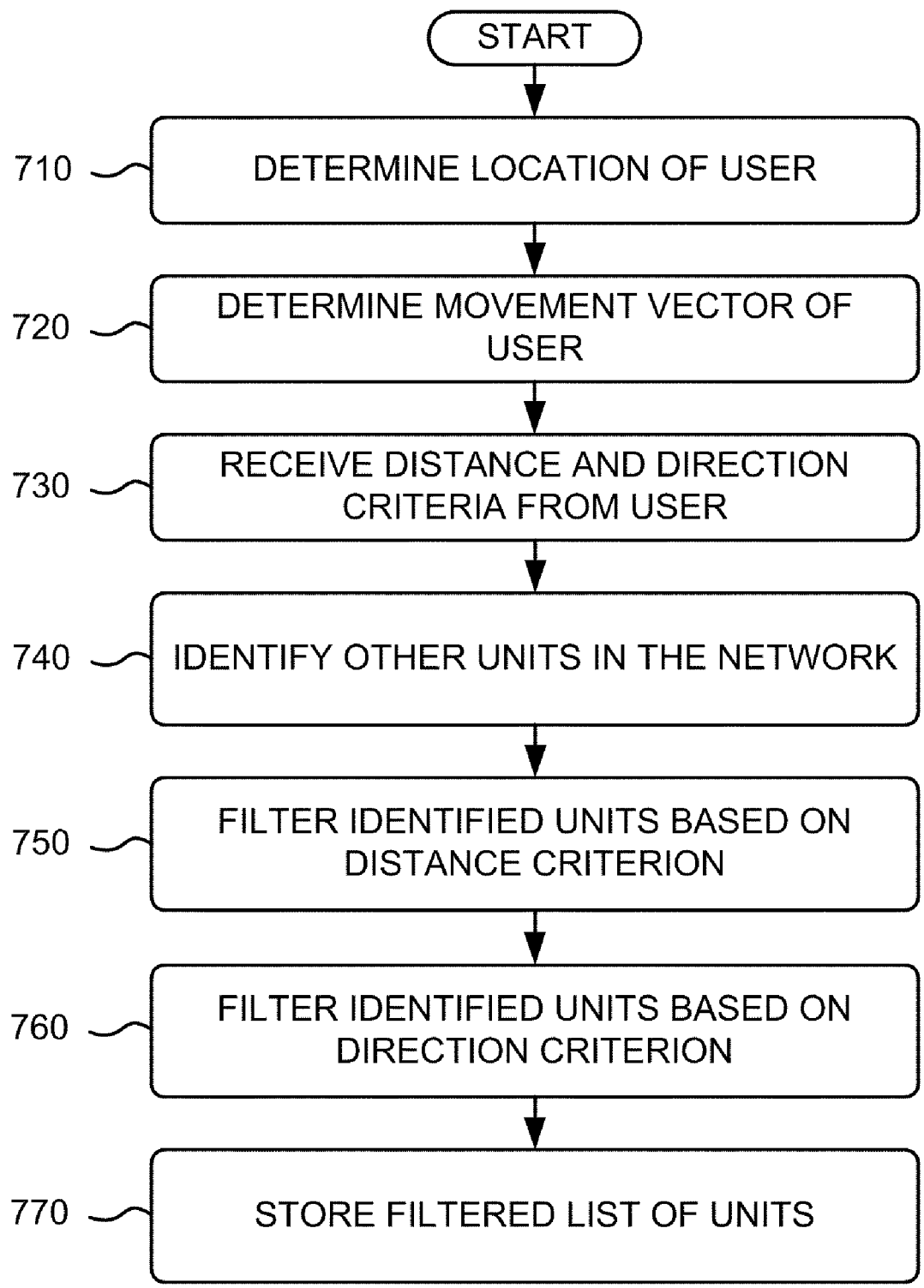
FIG. 7 is a flow diagram illustrating a process for filtering a list of communication units according to an exemplary implementation.

FIG. 7 is a flow diagram illustrating a process for filtering a list of communication units according to an exemplary implementation. Processing may begin with determining a location of a user of a mobile communication device (block 710). For example, location component 610 may determine a location of mobile communication device 210 using a GPS receiver located within mobile communication device 210. The location may be determined based on information received by a GPS receiver, based on information received from a sensor located within mobile communication device, based on information received from base station communication with mobile communication device 210 (e.g. GMS localization or information identifying a particular base station), based on information inputted by the user (e.g. user types in information about the user's location, or enters the information through voice input), based on sensors associated with the location of mobile communication device 210 (e.g. sensors located along a road), or based on previously stored information (e.g. location information stored in a location and direction database).

A movement vector associated with the user may be determined (block 720). For example, direction component 620 may determine the direction of movement of mobile communication device 210. In one implementation, the movement vector may be computed from the location information. For example, a direction of movement may be calculated from at least two location data points taken at two different times. For example, a first location $(x_1, y_1)$ at time $t_1$, and a second location $(x_2, y_2)$ at time $t_2$ can be used to compute a movement vector $v=(x_2-x_1)i+(y_2-y_1)j$. A speed of movement may be computed from this information as well. In another implementation, the movement vector may be received. For example, movement vector information may be received from a sensor located within mobile communication device 210, from information inputted by the user, received from a sensor associated with the location of mobile communication device 210, or received from memory or a storage device.

Distance and direction criteria may be received (block 730). In one implementation, distance and direction criteria may be configured by the user. For example, user interface 430 may receive the distance and direction criteria via user input. In another implementation, the distance and direction criteria may not be configurable by the user. For example, processing unit 520 of server 120 may retrieve the distance and direction criteria from memory 530 or from storage device 550. The distance and direction criteria may include a particular distance. For example, a user may select a distance of one kilometer. The distance and direction criteria may include a particular direction. For example, the user may select the same direction as the user, or a direction opposite to the user. If the user is in an urban environment, the user may also select a direction perpendicular to the user, if the user desires to send or receive messages from cars located on a cross street.

In one implementation, the distance and direction criteria may be automatically determined based on the user's location. For example, if the user is located in an urban environment, a first distance (e.g. substantially equal to the length of one block) may be selected. If the user is located in a suburban environment, a second distance (e.g. a distance based on line of sight) may be selected. If the user is located on a highway, a third distance (e.g. a distance of 1 kilometer) may be selected.

Other units (i.e., other mobile communication devices) connected to a network associated with mobile communication device 210 may be identified (block 740). For example, location filter 630 may retrieve a list of all units currently connected to communications network 110. Alternately or additionally to locating all the units connected to communications network 110, a subset of units connected to communications network 110 may be identified. For example, location filter 630 may identify all units associated with the same base station that is currently communicating with mobile communication device 210. As another example, location filter 630 may identify all units within a cell of origin within which mobile communication device 210 is operating.

The identified units may be filtered based on the distance criterion (block 750). A location of each of the identified units may be determined and compared with the determined location of the user. The location may be determined based on information received by a GPS receiver, based on information received from a sensor located within mobile communication device, based on information received from base station communication with mobile communication device 210 (e.g. GMS localization or information identifying a particular base station), based on information inputted by the user (e.g. user types in information about the user's location, or enters the information through voice input), based on sensors associated with the location of mobile communication device 210 (e.g. sensors located along a road), or based on previously stored information (e.g. location information stored in a location and direction database). For example, processing unit 520 may receive the location information from a particular unit via communication interface 580, or may retrieve previously stored information about the location of the particular unit from memory 530 or from storage device 550. The location of a particular identified unit may be determined from a GPS receiver located within the particular unit.

In one implementation, the units may be filtered based on a radius. For example, location filter 630 may select all units connected to communications network 110 that are with distance d of mobile communication device 210. Distance d may be determined by the distance criterion. All units within distance d*(1−a), may be selected, where a is the vector angle difference relative to the direction vector of the user, and a ranges from 0 to 1. In another implementation, the particular distance may be based on a hierarchical grid. For example, the location of mobile communication device 210 may include a cell in the hierarchical grid, and location filter 630 may identify all units connected to communications network 110 associated with the cell, with adjacent cells in the hierarchical grid, or with cells that are within a particular distance of the cell.

The identified units may be filtered based on the direction criterion (block 760). For example, direction filter 640 may select all units moving in a particular direction with respect to the user, such as all units moving in the same direction as the user, or all units moving in the opposite direction as the user. If the direction information is in the form of direction vectors, direction filter 640 may select all units, where the vector angle between the unit associated with the user and another unit is within a particular range, based on the direction criterion. For example, if the vector angle between two units is less than 30 degrees (or another specified degree amount), the two units may be designated as moving in the same direction. As another example, if the vector angle between two units is between 175 and 195 degrees, the two units may be designated as moving in opposite directions. In one implementation, the set of units filtered based on distance may be further filtered based on direction. In another implementation, all units connected to communications network 110 may be filtered based on direction, and an intersection may be taken between the set of units filtered based on distance and the set of units filtered based on direction.

A list of units filtered based on distance and direction may be stored (block 770). For example, processing unit 410 may store a filtered list of units in memory 420. Alternately or additionally, processing unit 520 may store the filtered list of units in memory 530 or in storage device 550. The list of units filtered based on distance and direction may be updated at particular intervals. Alternately or additionally, the list of units filtered based on distance and direction may be updated based on particular events. For example, the list may be updated when a user sends a message, turns on display 340, or requests an update. The list may be stored as a push to talk over cellular (PoC) group associated with mobile communication device 210.

Alternatively to distance and direction, or in addition to distance and direction, other criteria may be used for filtering the units. For example, units may be filtered based on vehicle type. A user may want to communicate with users of similar vehicles. For example, a driver of a commercial freight truck may want to communicate with drivers of other commercial freight trucks. Information about a type of vehicle associated with the user of mobile communication device 210 may be received. A user may enter vehicle information into mobile communication device 210. Alternately, mobile communication device 210 may communicate with a vehicle the user is driving and obtain vehicle information via such communication.

Units may be filtered based on being located on a specific road. Users may want to communicate with users of vehicles on a specific road. For example, a user may see an adjacent road with traffic that moves very slowly and may wish to receive messages from drivers on that road to find out what is causing the slow traffic. Information about a specific road associated with the user of mobile communication device 210 may be received. A user may enter road information into mobile communication device 210. Alternately, information about the specific road, on which a vehicle is located, may be determined from the location of users associated with the vehicles, or may be obtained from sensors associated with the road.

Units may be filtered based on a specific vehicle. A user may want to communicate with a specific vehicle. For example, a user may want to inform the vehicle in front that the vehicle has a malfunctioning light. Information about a specific vehicle associated with the user of mobile communication device 210 may be received. A user may enter vehicle information into mobile communication device 210. Alternately, information about a vehicle may be determined from mobile communication device 210 communicating with the vehicle.

Figure 8:
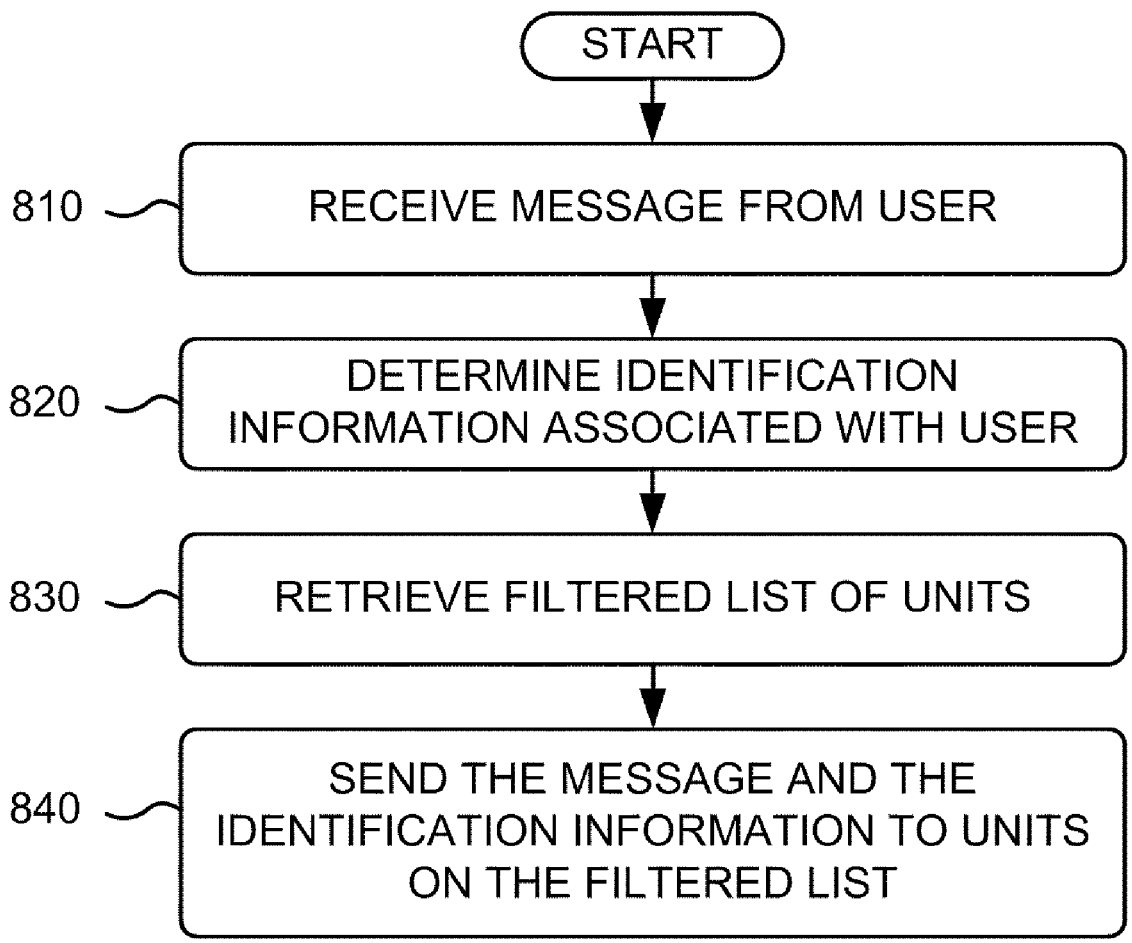
FIG. 8 is a flow diagram illustrating a process for sending a message to other users according to an exemplary implementation.

FIG. 8 is a flow diagram illustrating a process for sending a message to other users according to an exemplary implementation. Processing may begin with receiving a message from a user (block 810). For example, communication interface 580 of server 120 may receive a message from mobile communication device 210. Mobile communication device 120 may have received the message via user interface 430 based on user input, or may have retrieved the message from memory 420. For example, processing unit 410 may transmit a message automatically at particular intervals. The message may be an audio message, a video message, or a text message.

Identification information associated with the user may be determined (block 820). For example, processing unit 410 may obtain vehicle identification information from user interface 430. In one implementation, a user may enter vehicle information manually, such as entering a description of the vehicle or a license plate number. In another implementation, communication interface 440 may communicate with the vehicle via a short-range wireless connection and obtain vehicle information from the vehicle's computer. Vehicle information may also be retrieved from memory, such as memory 420 of mobile communication device 210 or from memory 530 or storage device 550 of server 120, where the information was previously obtained from the user. The identification information may help identify the user's vehicle to other drivers. For example, the identification information may include information such as "Blue sedan, Honda Civic, license plate ZVX, 4357."

A list of filtered units may be retrieved (block 830). In one implementation, processing unit 410 of mobile communication device 210 may retrieve a list of units within a particular distance and moving in a particular direction from memory 420. In another implementation, processing unit 520 of server device 120 may retrieve the list from memory 530 or storage device 550.

The message and the identification information may be sent to the units on the filtered list (block 840). For example, communication interface 580 may send the message to all units on the list of units filtered based on distance and direction by sending the message to base stations associated with the units. The identification information associated with the user may be sent along with the message. The identification information may identify the vehicle of the user to the users of the units receiving the message. For example, if the message is "engine problems, cannot drive faster than 50 kph," along with identification information "blue sedan, Honda Civic, license plate ZVX, 4357," other drivers that receive the message will know to avoid the blue Honda Civic vehicle.

Figure 9:
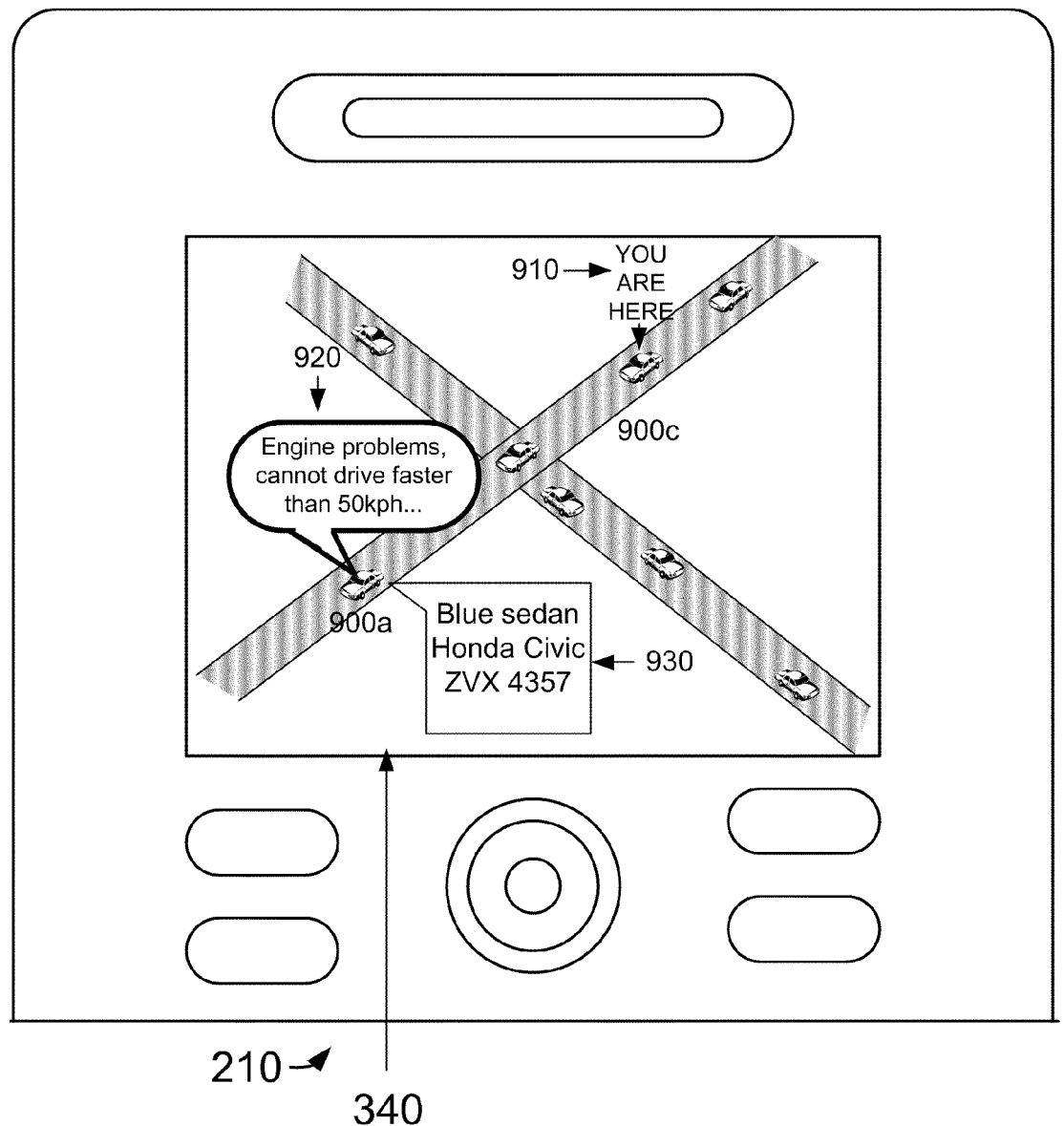
FIG. 9 is a diagram of exemplary information that may be provided to a user.

FIG. 9 is a diagram of exemplary information that may be provided to a user. A user may be provided with messages from users of a group filtered based on distance and direction. For example, a user of mobile communication device 210 may be driving in a vehicle and may receive messages from drivers of other vehicles, along with indications of which vehicles the drivers are driving.

Display 340 of mobile communication device 210 may display a map with roads and vehicles on the roads. In one implementation, vehicles of all users, connected to communications network 110, that are in the vicinity of the user of mobile communication device 210 may be displayed. In another implementation, only vehicles of users that are sending messages may be displayed. In yet another implementation, all vehicles on the roads in the vicinity of the user of mobile communication device 210 may be displayed, even if not connected to mobile communication device 210. Information about vehicles that do not include mobile communication devices connected to communications network 110 may be obtained, for example, from sensors located on the road or from satellite images.

Display 340 may include an icon 900a of a vehicle sending a message, an icon 900c of a vehicle of the user of mobile communication device 210, an indication 910 of which vehicle is the user's vehicle, a message 920, and a description 930 of the vehicle from which the message originates. Icon 900a may include a moving icon that illustrates the position of a vehicle sending a message relative to the position of the vehicle of the user. Icon 900a may change appearance when the user of the vehicle to which the icon corresponds sends a message. For example, icon 900a may start flashing or change color when a message is received from the vehicle corresponding to the icon. Indication 910 may include an indication of the user's vehicle, and may give the user an idea of where the user's vehicle is on the road in relation to other vehicles. Indication 910 may highlight the user's vehicle and may include a message indicating that icon 900c represents the user's vehicle.

Message 920 may include a message sent by the user in the vehicle associated with icon 900a. Message 920 may be in the form of a speech balloon associated with icon 900a. Description 930 may include a short description of the vehicle associated with message 920. For example, description 930 may include a color and style of vehicle 900a, or a license plate of vehicle 900a. While FIG. 9 depicts message 920 in the form of a text message, the messages may take any form handled by communications network 110, such as audio or video messages.

CONCLUSION

Implementations described here may provide a communication filter that determines other mobile communication devices that are within a particular distance and moving in a particular direction with respect to a user of a mobile communication device. The location and direction of the user's mobile communication device and the other mobile communication devices may be based on GPS information obtained by the respective mobile communication devices. The communication filter may be used while the user is in a vehicle to communicate with other vehicles that are in the vicinity of the user's vehicle and moving in the same direction. While the figures depict vehicles on a road, a communication filter according to the implementations herein may be used by watercraft, bicyclists, or pedestrians.

The foregoing description provides illustration and description, but is not intended to be exhaustive or to limit the invention to the precise form disclosed. Modifications and variations are possible in light of the above teachings or may be acquired from practice of the invention.

Furthermore, while series of blocks have been described with respect to FIGS. 7 and 8, the order of the blocks may be modified in other implementations. Further, non-dependent blocks may be performed in parallel.

Still further, aspects have been mainly described in the context of a mobile communication device. However, the device and methods described herein may be used with any type of communication device, such as communication devices mounted in a vehicle.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain aspects described herein may be implemented as "logic" that performs one or more functions. This logic may include hardware, such as a processor, microprocessor, an application specific integrated circuit or a field programmable gate array, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A computing device, comprising:
   processing logic configured to:
   determine a location of a mobile communication device,
   determine a direction of movement of the mobile communication device,
   identify at least one other mobile communication device located within a particular distance of the mobile communication device and that is moving in a particular direction with respect to the mobile communication device,
   receive a message from the mobile communication device,
   receive information identifying a vehicle associated with the mobile communication device,
   send the message from the mobile communication device to the at least one other mobile communication device, wherein the message includes the received information identifying the vehicle associated with the mobile communication device.

2. The device of claim 1, wherein the computing device is included within the mobile communication device.

3. The device of claim 2, further comprising a Global Positioning System (GPS) receiver, and wherein the processing logic is further configured to determine the location of the mobile communication device using information obtained from the GPS receiver.

4. The device of claim 3, wherein the processing logic is further configured to determine the direction of movement of the mobile communication device using information obtained from the GPS receiver.

5. The device of claim 1, wherein the computing device includes a server device remote from the mobile communication device, and wherein the server device communicates with the mobile communication device via, a communications network.

6. The device of claim 5, wherein the processing logic is further configured to determine the location of the mobile communication device using at least one of:
   information received by a GPS receiver,
   information received from a sensor located within the mobile communication device,
   information received from a base station associated with the mobile communication device,
   information inputted by a user of the mobile communication device,
   information received from sensors associated with the location of mobile communication device, or
   previously stored location information.

7. The device of claim 1, further comprising a user interface configured to send and receive messages to the at least one other mobile communication device.

8. The computing device of claim 1, wherein the mobile communication device and the at least one other mobile communication device are associated with a same push to talk over cellular group.

9. A method performed by a device that includes a processor and a memory, the method comprising:
   determining, by the processor, a location of a mobile communication device; device;
   determining, by the processor, a direction of movement of the mobile communication
   identifying, by the processor, at least one other mobile communication device located within a particular distance of the determined location and associated with a particular direction of movement in relation to the determined direction of movement;
   receiving, by the processor, a message from the mobile communication device;
   receiving, by the processor, information identifying a vehicle associated with the mobile communication device; and
   sending, by the processor, the message from the mobile communication device to the at least one other mobile communication device, wherein the message includes the received information identifying the vehicle associated with the mobile communication device.

10. The method of claim 9, further comprising:
receiving a message from the at least one other mobile communication device; and
sending the message from the at least one other mobile communication device to the mobile communication device.

11. The method of claim 10, further comprising:
receiving information identifying a vehicle associated with the at least one other mobile communication device; and
providing the received information, via the message received from the at least one other mobile communication device, to the mobile communication device.

12. The method of claim 9, wherein the location of the mobile communication device is determined based on information obtained from a Global Positioning System (GPS) receiver associated with the mobile communication device.

13. The method of claim 9, wherein the direction of movement of the mobile communication device includes a direction vector, and wherein the particular direction of movement is determined based on a difference in an angle between the direction vector of the mobile communication device and a direction vector associated with the at least one other mobile communication device.

14. The method of claim 9, wherein identifying the at least one other mobile communication device includes selecting all other mobile communication devices that are moving in substantially a same direction as the mobile communication device.

15. The method of claim 9, wherein identifying the at least one other mobile communication device includes selecting all other mobile communication devices that are moving in substantially an opposite direction from the mobile communication device.

16. The method of claim 9, wherein identifying the at least one other mobile communication device includes determining a location of the at least one other mobile communication device based on at least one of:
information received by a GPS receiver,
information received from a sensor located within the at least one other mobile communication device,
information received from a base station associated with the at least one other mobile communication device,
information inputted by a user of the at least one other mobile communication device,
information received from sensors associated with the location of at least one other mobile communication device, or
previously stored location information associated with the at least one other mobile communication device.

17. The method of claim 9, wherein identifying the at least one other mobile communication device includes determining a direction associated with the at least one other mobile communication device based on at least one of:
location information received at two different points in time;
information received from a sensor located within the at least one other mobile communication device;
information inputted by a user of the at least one other mobile communication device;
information received from a sensor associated with a location of the at least one other mobile communication device; or
previously stored direction of movement information associated with the at least one other mobile communication device.

18. A system comprising:
means for determining a location of a mobile communication device based on information obtained by a Global Positioning System (GPS) receiver associated with the mobile communication device;
means for determining a direction of movement of the mobile communication device;
means for identifying other mobile communication devices that are within a particular distance of the mobile communication device;
means for selecting ones of the identified other mobile communication devices that are moving in substantially the same direction as the mobile communication device;
means for receiving a message from the mobile communication device;
means for receiving information identifying a vehicle associated with the mobile communication device; and
means for providing the message to the selected ones of the other mobile communication devices, wherein the message includes at least some of the received information identifying the vehicle associated with the mobile communication device.

19. The method of claim 9, wherein identifying the at least one other mobile communication device includes:
selecting the at least one other mobile communication device based on the at least one other mobile communication device being associated with a same vehicle type as the mobile communication device.

20. The method of claim 9, wherein identifying the at least one other mobile communication device includes:
selecting the at least one other mobile communication device based on the at least one other mobile communication device being associated with a same road as the mobile communication device.

* * * * *